(12) United States Patent
Carnevali

(10) Patent No.: US 12,540,632 B2
(45) Date of Patent: Feb. 3, 2026

(54) HYDRAULIC SYSTEM FOR A VEHICLE AND A COMPUTER-IMPLEMENTED METHOD

(71) Applicant: Volvo Construction Equipment AB, Eskilstuna (SE)

(72) Inventor: Alessandro Carnevali, Eskilstuna (SE)

(73) Assignee: VOLVO CONSTRUCTION EQUIPMENT AB, Eskilstuna (SE)

( * ) Notice: Subject to any disclaimer, the term of this patent is extended or adjusted under 35 U.S.C. 154(b) by 0 days.

(21) Appl. No.: 18/599,545

(22) Filed: Mar. 8, 2024

(65) Prior Publication Data
US 2024/0337276 A1 Oct. 10, 2024

(30) Foreign Application Priority Data

Apr. 4, 2023 (EP) ..................................... 23166540

(51) Int. Cl.
| | | |
|---|---|---|
| *F15B 15/18* | (2006.01) | |
| *F15B 15/20* | (2006.01) | |
| *F16H 57/02* | (2012.01) | |

(52) U.S. Cl.
CPC .............. *F15B 15/18* (2013.01); *F15B 15/20* (2013.01); *F15B 2211/71* (2013.01); *F15B 2211/76* (2013.01); *F16H 57/02* (2013.01); *F16H 2057/02026* (2013.01); *F16H 2057/02034* (2013.01)

(58) Field of Classification Search
CPC ........... F04B 17/03; F16H 2057/02034; F16H 61/0028; F15B 15/18
See application file for complete search history.

(56) References Cited

U.S. PATENT DOCUMENTS

| | | | | |
|---|---|---|---|---|
| 7,937,194 | B2* | 5/2011 | Nasr | ..................... B60W 10/08 |
| | | | | 303/174 |
| 2013/0228377 | A1* | 9/2013 | Kuittinen | ................ B60L 1/003 |
| | | | | 173/27 |
| 2017/0343098 | A1* | 11/2017 | Rosinski | ............... F04C 13/008 |
| 2021/0309099 | A1* | 10/2021 | Long | ........................ B60K 1/00 |
| 2022/0134856 | A1* | 5/2022 | Andringa | ................ B60L 50/16 |
| | | | | 74/15.4 |

FOREIGN PATENT DOCUMENTS

| | | |
|---|---|---|
| CH | 703 260 A1 | 12/2011 |
| DE | 10 2010 010 578 A1 | 9/2011 |

(Continued)

OTHER PUBLICATIONS

Extended European Search Report in corresponding European Application No. 23166540.7 dated Aug. 23, 2023 (7 pages).

*Primary Examiner* — Abiy Teka
(74) *Attorney, Agent, or Firm* — Jeffri A. Kaminski; Venable LLP

(57) ABSTRACT

A hydraulic system for a vehicle is provided. The hydraulic system includes a first electric motor, a second electric motor, a gearbox arranged to be driven by the first and second electric motors, a hydraulic pump arranged to be driven by the gearbox, and a control arrangement configured to individually control the first and second electric motors to either run at a reference speed or to deliver a reference torque and during operation control at least one of the first and second electric motors to deliver a reference torque.

18 Claims, 1 Drawing Sheet

(56) References Cited

FOREIGN PATENT DOCUMENTS

| | | |
|---|---|---|
| DE | 10 2013 005 721 A1 | 10/2014 |
| EP | 3489424 A1 | 5/2019 |
| JP | 4945473 B2 | 6/2012 |
| JP | 2022 156161 A | 10/2022 |
| WO | 2017040825 A1 | 3/2017 |
| WO | 2022 011013 A1 | 1/2022 |

* cited by examiner

HYDRAULIC SYSTEM FOR A VEHICLE AND A COMPUTER-IMPLEMENTED METHOD

TECHNICAL FIELD

The disclosure relates generally to electric motor control. In particular aspects, the disclosure relates to a hydraulic system for a vehicle, a computer-implemented method of operating a hydraulic system, a computer program product and a non-transitory computer-readable storage medium. The disclosure can be applied to heavy-duty vehicles, such as trucks, buses, and construction equipment, among other vehicle types. Although the disclosure may be described with respect to a particular vehicle, the disclosure is not restricted to any particular vehicle.

BACKGROUND

Vehicles, in particular heavy-duty vehicles, may comprise hydraulic equipment. For this reason, such vehicles often comprise a hydraulic pump and a means for driving the hydraulic pump. It may be desirable to avoid driving means that in the form of an internal combustion engine for driving the hydraulic pump.

SUMMARY

According to a first aspect of the disclosure, there is provided a hydraulic system for a vehicle, the hydraulic system comprising a first electric motor, a second electric motor, a gearbox arranged to be driven by the first and second electric motors, a hydraulic pump arranged to be driven by the gearbox, and a control arrangement configured to individually control the first and second electric motors to either run at a reference speed or to deliver a reference torque and during operation control at least one of the first and second electric motors to deliver a reference torque.

A technical benefit may include that the two motors may be operated together to drive the hydraulic pump with no or minimum stability issues. Further, using two motors instead of one motor may result in improved hydraulic pump control, lower costs and increased redundancy.

Tests have been shown that should both motors simultaneously be controlled to run at a reference speed, there may be stability issues such as resonance. From a cost perspective, it may be beneficial to use large series of relatively small motors, instead of fewer larger motors. Such relatively small motors may find use is as great number of applications, and in some of these one motor may be sufficient whereas other require two or more motors.

Optionally, the control arrangement is configured to simultaneously control the first motor to run at a reference speed and control the second motor to deliver a reference torque. A technical benefit may include that a hydraulic supply request may be quickly and reliably delivered by the first and the second motor.

Optionally, the control arrangement is adapted to control the first and second motors in response to a hydraulic supply request and is configured, based on said hydraulic supply request, to selectively control the first motor to run at a reference speed and the second motor to deliver a reference torque, or control the first motor to deliver a reference torque and the second motor to deliver a reference torque. A technical benefit may include that the hydraulic system is suited to respond to various hydraulic supply requests. Should there be a request to increase a hydraulic pump speed, tests have shown that it is beneficial to control the first motor to run at a reference speed and the second motor to deliver a reference torque. The first motor may then, completely or essentially completely, act to meet the desired hydraulic pump speed while there is no interference between the motors. Thus, when there is a request to increase a hydraulic pump speed, the motors may deliver different magnitudes of torques. Should there be a request to increase a hydraulic pump torque, tests have shown that it is beneficial to control the first motor to deliver a reference torque and the second motor to deliver a reference torque. The motors may then jointly act to keep the hydraulic pump speed constant while the desired hydraulic pump torque may vary. Optionally, in the latter case the motors may be controlled to deliver essentially equal magnitudes of torques to increase motor life (same wear). Such equal torque distribution may further be beneficial for cooling system design, as both motors may require the same level of cooling.

Optionally, the control arrangement is configured to control the first motor to run at a reference speed and the second motor to deliver a reference torque in case the hydraulic supply request involves adjusting the hydraulic pump speed, and control the first motor to deliver a reference torque and the second motor to deliver a reference torque in case the hydraulic supply request involves adjusting the hydraulic pump torque. A technical benefit may include that the hydraulic system is suited to respond to various hydraulic supply requests, as explained in the preceding paragraph.

Optionally, the control arrangement is configured to control the first motor to deliver a reference torque and the second motor to deliver a reference torque in case the desired hydraulic pump speed has remained unchanged for a predetermined duration of time. A technical benefit may include beneficial hydraulic pump control. In many applications, the most likely hydraulic supply request, after desired hydraulic pump speed has remained unchanged for a predetermined duration of time, will involve adjusting the hydraulic pump torque. Thus, the most likely next hydraulic supply request is predicted. A technical benefit may include improved, in this case quicker, hydraulic pump control. Depending on application, the predetermined duration of time may be for example 10 seconds, 1 minute or 10 minutes. The predetermined duration of time is parameter that may be calibrated by a service technician to suit a particular application or in accordance with a customer requirement.

Optionally, the control arrangement is connected to an operator input interface and configured to control the first motor to deliver a reference torque and the second motor to deliver a reference torque in case the operator input interface is maneuvered in a manner that is predicted to involve an increase in the desired hydraulic pump torque. Thus, the most likely next hydraulic supply request is predicted. A technical benefit may include improved, in this case quicker, hydraulic pump control. An example of an operator input interface is a joystick.

Optionally, the control arrangement comprises a first electronic control unit connected to the first motor and a second electronic control unit connected to the second motor. A technical benefit may include enhanced redundancy.

Optionally, the first electronic control unit has a faster response time than the second electronic control unit. This is beneficial in particular for quick and stable control when the first electronic control unit controls the first motor to run at a reference speed while the second electronic control unit controls the second motor to deliver a reference torque. The difference in response times may be calibrated to suit a particular application. In some examples, the first control unit may have a response time that it at least 20 percent faster than the response time of the second control unit. The ratio may for example be 1.5, 2 or 10 (first electronic control unit response time/second electronic control unit response time).

Optionally, the first electronic control unit is configured to control the first motor to deliver a reference speed and the second electronic control unit is configured to control the second motor to deliver a reference torque. A technical benefit may include improved hydraulic control, as explained in the preceding paragraph.

Optionally, the first electronic control unit comprises a first direct current voltage input and a first alternating current voltage output connected to the first motor, and the second electronic control unit comprises a second direct current voltage input and a second alternating current voltage output connected to the second motor.

Another possible term for reference in the expressions reference speed and reference torque may be set or requested. Controlling a motor to run at a reference speed may be referred to as motor speed control, and controlling a motor to deliver a reference torque may be referred to as motor torque control.

According to a second aspect of the disclosure, there is provided a vehicle comprising the above-described hydraulic system. The vehicle may be a construction machine such as an excavator, a wheel-loader, an articulated hauler. Alternatively, the vehicle may be an on-road vehicle such as a truck.

Optionally, the vehicle comprises a vehicle electric control unit connected to a first electronic control unit adapted to control the first motor and connected to a second electronic control unit adapted to control the second motor, a battery connected to the first and second electronic control units, and an operator input interface.

According to a third aspect of the disclosure, there is provided a computer-implemented method of operating a hydraulic system for a vehicle, the hydraulic system comprising a first and a second electric motor, the method comprising individually controlling the first and second electric motors to either run at a reference speed or to deliver a reference torque wherein, during operation, at least one of the first and second electric motors is controlled to deliver a reference torque.

According to a fourth aspect of the disclosure, there is provided a computer program product comprising program code for performing, when executed by a processor device, the computer-implemented method.

According to a fifth aspect of the disclosure, there is provided a non-transitory computer-readable storage medium comprising instructions, which when executed by the processor device, cause the processing circuitry to perform the computer-implemented method.

The disclosed aspects, examples (including any preferred examples), and/or accompanying claims may be suitably combined with each other as would be apparent to anyone of ordinary skill in the art. Additional features and advantages are disclosed in the following description, claims, and drawings, and in part will be readily apparent therefrom to those skilled in the art or recognized by practicing the disclosure as described herein.

BRIEF DESCRIPTION OF THE DRAWINGS

Examples are described in more detail below with reference to the appended drawings.

DETAILED DESCRIPTION

The detailed description set forth below provides information and examples of the disclosed technology with sufficient detail to enable those skilled in the art to practice the disclosure.

The inventive concept of the present disclosure involves controlling a first and a second electric motor 10, 20 to either run at a reference speed 10rs, 20rs or to deliver a reference torque 10rt, 20rt and controlling at least one of the motors 10, 20 to deliver a reference torque 10rt, 20rt.

Figure 1:
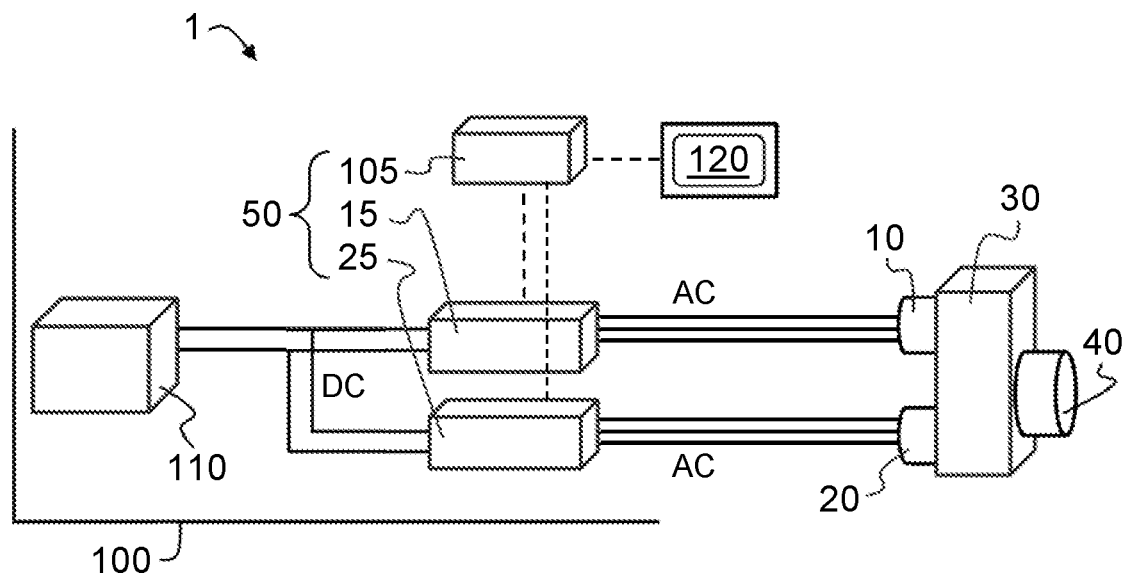
FIG. 1 schematically illustrates an exemplary hydraulic system for a vehicle.

FIG. 1 shows a hydraulic system 1 for a vehicle 100. A part of a vehicle 100 that is provided with the hydraulic system 1 is schematically indicated. The hydraulic system 1 comprises a first electric motor 10 and a second electric motor 20 that are arranged to drive a gearbox 30. In the present example, the motors 10, 20 are mounted to the gearbox 30 and drive the latter in parallel.

As is illustrated, the hydraulic system 1 further comprises a hydraulic pump 40 arranged to be driven by the gearbox 30. In the present example, the hydraulic pump 40 is mounted to the gearbox 30. Thus, the motors 10, 20, the gearbox 30 and the hydraulic pump 40 may be provided as one unit.

Referring continuously to FIG. 1, the hydraulic system further comprises a control arrangement 50 configured to individually control the first and second electric motors 10, 20 to either run at a reference speed 10rs, 20rs or to deliver a reference torque 10rt, 20rt. In accordance with the inventive concept, during operation the control arrangement 50 is configured to control at least one of the first and second electric motors 10, 20 to deliver a reference torque 10rt, 20rt. An example of how the hydraulic system may be operated may be understood by studying FIG. 2 together with FIG. 1.

In other words, the first motor may be controlled to run at a reference (or set or requested) speed and the second motor may be controlled to deliver a reference (or set or requested) torque, or the first motor may be controlled to deliver a reference torque and the second motor may be controlled to run at a reference speed, or both motors may be controlled to deliver a reference torque.

Typically, the control arrangement 50 is configured to simultaneously control the first motor 10 to run at a reference speed 10rs and control the second motor 20 to deliver a reference torque 20rt. Thus, the first and second motors 10, 20 are during operation controlled at the same time, i.e. simultaneously, by the control arrangement 50.

Figure 2:
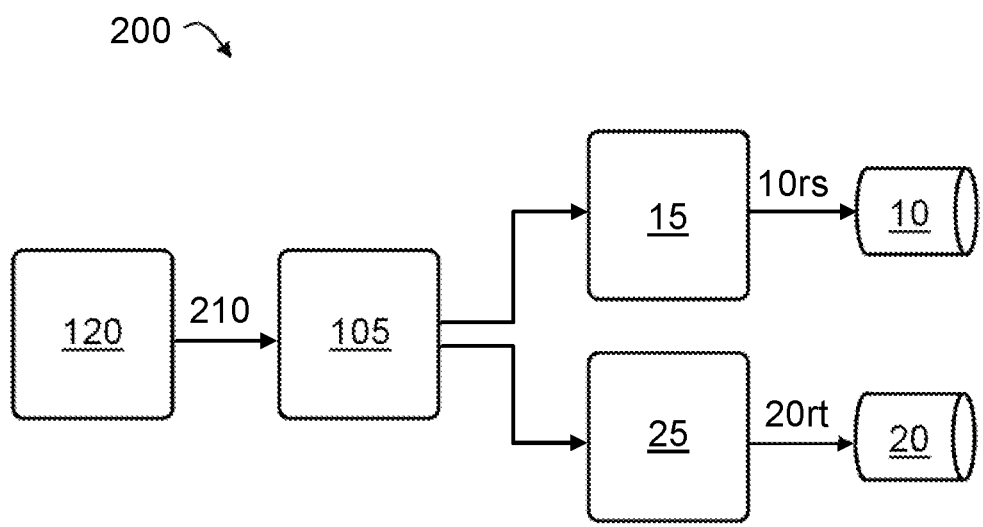
FIG. 2 schematically illustrates an exemplary method of operating hydraulic system.

Referring in particular to FIG. 2, the present control arrangement 50 is adapted to control the first and second motors 10, 20 in response to a hydraulic supply request 210 and is configured, based on said hydraulic supply request, to selectively control the first motor 10 to run at a reference speed and the second motor 20 to deliver a reference torque, or control the first motor 10 to deliver a reference torque and the second motor 20 to deliver a reference torque. In FIG. 2 is illustrated that the first motor 10 is controlled to run at a reference speed 10rs and the second motor 20 is controlled to deliver a reference torque 20rt. The arrows denoted 10rs and 20rt denote instructions and/or electric power provided to the motors 10, 20 to cause the motors 10, 20 to run at a dereference speed or to deliver a reference torque.

The control arrangement 50 may be configured to control the first motor 10 to run at a reference speed and the second motor 20 to deliver a reference torque in case the hydraulic supply request 210 involves adjusting the hydraulic pump speed, and control the first motor 10 to deliver a reference torque and the second motor 20 to deliver a reference torque in case the hydraulic supply request 210 involves adjusting the hydraulic pump torque.

Merely as one illustrative example, the vehicle 100 may be an excavator. An excavator operator may at the start of a work shift set a hydraulic supply desire or request, typically a desired hydraulic pump speed, i.e. a desired pump rpm. A suitable pump rpm may depend on the current work tasks. The desired pump rpm may by the control arrangement 50 be translated to a motor reference speed, and the control arrangement 50 may instruct one of the motors (in this example the first motor 10) to run at that reference speed. Once the pump rpm has been reached, the operator typically starts working using the excavator bucket. Thus, the load will typically vary quite abruptly, and as a result, the hydraulic pump torque will need to be abruptly adjusted to meet the load. In this operational condition, the control arrangement 50 may control both motors 10, 20 to deliver a reference torque.

The control arrangement 50 may be configured to control the first motor 10 to deliver a reference torque and the second motor 20 to deliver a reference torque in case the desired hydraulic pump speed has remained unchanged for a predetermined duration of time. In the illustrative example, after the operator has set the desired pump rpm, the control arrangement 50 may switch from controlling the first motor 10 to run at a reference speed and the second motor 20 to deliver a reference torque to controlling both motors 10, 20 to deliver a reference torque 1-10 seconds after the hydraulic pump speed been changed. Alternatively, both motors 10, 20 may be controlled to deliver a reference torque immediately after the desired pump rpm has been reached.

As is indicated in FIG. 1, the present control arrangement 50 is connected to an operator input interface 120 (e.g. a joystick or a pedal or an on-board computer) and configured to control the first motor 10 to deliver a reference torque and the second motor 20 to deliver a reference torque in case the operator input interface 120 is maneuvered in a manner that is predicted to involve an increase in the desired hydraulic pump torque. Referring to the above illustrative example, once the operator starts moving the bucket, the hydraulic pump torque will likely need to be abruptly adjusted.

The present hydraulic system 1 may be adapted to, when the first and second motors 10, 20 are controlled to deliver a reference torque, control the first and second motors (10, 20) to deliver essentially equal magnitudes of torques. In other words, the hydraulic pump torque may be evenly distributed over both motors 10, 20.

The control arrangement 50 may comprise, as is illustrated in FIG. 1, a first electronic control unit 15 connected to the first motor 10 and a second electronic control unit 25 connected to the second motor 20. Thus, there may be separate electronic control units 15, 25, each dedicated to one of the motors 10, 20.

The first electronic control unit 15 may have a faster response time than the second electronic control unit 25. As has been described, the first motor 10 may be the one that is primarily responsible for obtaining the desired hydraulic pump speed.

Thus, referring to the above, the first electronic control unit 15 may be configured to control the first motor 10 to deliver a reference speed and the second electronic control unit 25 may be configured to control the second motor 20 to deliver a reference torque.

As is indicated in FIG. 1, the first electronic control unit 15 may comprise a first direct current voltage input, and a first alternating current voltage output connected to the first motor 10. Similarly, the second electronic control unit 25 may comprise a second direct current voltage input and a second alternating current voltage output connected to the second motor 20. Thus, the electronic control units 15, 25 may comprise means to convert DC current to AC current. As is known to skilled persons, electric motors, such as for example permanent magnet motors, may be controlled to deliver a desired torque or a desired speed by suitably converting DC current to AC current. In other examples, means to convert DC current to AC current may not be incorporated in the electronic control units 15, 25.

Referring again to FIG. 1, housings of the first and second motors 10, 20 may be attached to a housing of the gearbox 30, Further, a housing of the hydraulic pump 40 may be attached to the housing of the gearbox 30. Thus, the motors, the gearbox and the hydraulic pump may be provided as a single unit. In other examples, the motors and the gearbox may be provide as a single unit.

In the preset example, the first and second motors 10, 20 are arranged to drive the gearbox in parallel. The present gearbox 30 is a reduction gearbox, for example a 10:1 reduction gearbox.

The first and second motors 10, 20 may be dimensioned such that operation of both motors 10, 20 is required during nominal operation of the hydraulic system 1. Such solution may be cost-effective, as compared to using larger (higher power) motors. It is believed more cost-effective to use two smaller motors and a gearbox instead of one large motor.

The vehicle 100 that is indicated in FIG. 1 may be a construction machine such as an excavator (illustrative example), a wheel-loader, or an articulated hauler. The vehicle 100 may alternatively be an on-road vehicle such as a truck or a bus.

The vehicle 100 may comprise a vehicle electric control unit 105 connected to a first electronic control unit 15 adapted to control the first motor 10 and connected to a second electronic control unit 25 adapted to control the second motor 20. The electronic control units 15, 25 may be of the types described herein. The vehicle 100 may further comprise a battery 110 connected to the first and second electronic control units 15, 25, and an operator input interface 120 (e.g. the above-described joystick). The battery may be a so-called high voltage battery that is capable of powering the hydraulic system 1 and optionally the vehicle 100. Thus, the vehicle 100 may be an electric vehicle or a hybrid vehicle.

A computer-implemented method 200 of operating a hydraulic system 1 for a vehicle 100 is schematically shown in FIG. 2. The hydraulic system 1 comprises a first and a second electric motor 10, 20 (optimally of the type described herein), the method 200 comprises individually controlling the first and second electric motors 10, 20 to either run at a reference speed or to deliver a reference torque wherein, during operation, at least one of the first and second electric motors 10, 20 is controlled to deliver a reference torque. Thus, the disclosure further relates to a computer program product comprising program code for performing, when executed by a processor device 120 (FIG. 1), the computer-implemented method 200, and a non-transitory computer-readable storage medium comprising instructions, which when executed by the processor device, cause the processing circuitry to perform the computer-implemented method 200.

The inventive concept may find a more general use in vehicles that are propelled by dual electric motors. Thus, in a general aspect of the disclosure there is provided a motor control system 1 for a vehicle 100, the system 1 comprising a first electric motor 10, a second electric motor 20, a gearbox 30 arranged to be driven by the first and second electric motors 10, 20, a vehicle wheel arranged to be driven by the gearbox 30, and a control arrangement 50 configured to individually control the first and second electric motors 10, 20 to either run at a reference speed 10rs, 20rs or to deliver a reference torque 10rt, 20rt and during operation control at least one of the first and second electric motors 10, 20 to deliver a reference torque 10rt, 20rt. As is to be apprehended, the gearbox may be connected directly to the vehicle wheel, or be connected thereto via a transmission or a drive shaft. Further features, and associated advantage, of such a motor control system should become clear to a skilled person from those described in connection with the hydraulic system 1.

Also disclosed are examples according to the following clauses:

1. A hydraulic system (1) for a vehicle (100), the hydraulic system (1) comprising
    a first electric motor (10),
    a second electric motor (20),
    a gearbox (30) arranged to be driven by the first and second electric motors (10, 20),
    a hydraulic pump (40) arranged to be driven by the gearbox (30), and
    a control arrangement (50) configured to
        individually control the first and second electric motors (10, 20) to either run at a reference speed (10rs, 20rs) or to deliver a reference torque (10rt, 20rt) and
        during operation control at least one of the first and second electric motors (10, 20) to deliver a reference torque (10rt, 20rt).

2. The hydraulic system (1) of clause 1, wherein the control arrangement (50) is configured to simultaneously control the first motor (10) to run at a reference speed (10rs) and control the second motor (20) to deliver a reference torque (20rt).

3. The hydraulic system (1) of clause 1 or 2, wherein the control arrangement (50) is adapted to control the first and second motors (10, 20) in response to a hydraulic supply request (210) and is configured, based on said hydraulic supply request, to selectively
    control the first motor (10) to run at a reference speed and the second motor (20) to deliver a reference torque, or
    control the first motor (10) to deliver a reference torque and the second motor (20) to deliver a reference torque.

4. The hydraulic system (1) of clause 3, wherein the control arrangement (50) is configured to
    control the first motor (10) to run at a reference speed and the second motor (20) to deliver a reference torque in case the hydraulic supply request (210) involves adjusting the hydraulic pump speed, and
    control the first motor (10) to deliver a reference torque and the second motor (20) to deliver a reference torque in case the hydraulic supply request (210) involves adjusting the hydraulic pump torque.

5. The hydraulic system (1) of clause 4, wherein the control arrangement (50) is configured to control the first motor (10) to deliver a reference torque and the second motor (20) to deliver a reference torque in case the desired hydraulic pump speed has remained unchanged for a predetermined duration of time.

6. The hydraulic system (1) of clause 4 or 5, wherein the control arrangement (50) is connected to an operator input interface (120) and configured to control the first motor (10) to deliver a reference torque and the second motor (20) to deliver a reference torque in case the operator input interface (120) is maneuvered in a manner that is predicted to involve an increase in the desired hydraulic pump torque.

7. The hydraulic system (1) of any preceding clause adapted to, when the first motor (10) is controlled to deliver a reference torque and the second motor (20) is controlled to deliver a reference torque, control the first and second motors (10, 20) to deliver essentially equal magnitudes of torques.

8. The hydraulic system (1) of any preceding clause, wherein the control arrangement (50) comprises a first electronic control unit (15) connected to the first motor (10) and a second electronic control unit (25) connected to the second motor (20).

9. The hydraulic system (1) of clause 8, wherein the first electronic control unit (15) has a faster response time than the second electronic control unit (25).

10. The hydraulic system (1) of clause 9, wherein the first electronic control unit (15) is configured to control the first motor (10) to deliver a reference speed and the second electronic control unit (25) is configured to control the second motor (20) to deliver a reference torque.

11. The hydraulic system (1) according to any of clauses 8 to 10, wherein
    the first electronic control unit (15) comprises a first direct current voltage input and a first alternating current voltage output connected to the first motor (10), and
    the second electronic control unit (25) comprises a second direct current voltage input and a second alternating current voltage output connected to the second motor (20).

12. The hydraulic system (1) of any preceding clause, wherein housings of the first and second motors (10, 20) are attached to a housing of the gearbox (30) and, optionally, a housing of the hydraulic pump (40) is attached to the housing of the gearbox (30).

13. The hydraulic system (1) of any preceding clause, wherein the first and second motors (10, 20) are arranged to drive the gearbox in parallel.

14. The hydraulic system (1) of the preceding clause, wherein the gearbox (30) is a reduction gearbox.

15. The hydraulic system (1) of any preceding clause, wherein the first and second motors (10, 20) are dimensioned such that operation of both motors (10, 20) is required during nominal operation of the hydraulic system (1).

16. A vehicle (100) comprising the hydraulic system (1) of any preceding clause, the vehicle optionally being a construction machine such as an excavator, a wheel-loader, an articulated hauler, or optionally being an on-road vehicle such as a truck or a bus.

17. The vehicle (100) of clause 16 comprising
    a vehicle electric control unit (105) connected to a first electronic control unit (15) adapted to control the first motor (10) and connected to a second electronic control unit (25) adapted to control the second motor (20),
    a battery (110) connected to the first and second electronic control units (15, 25), and
    an operator input interface (120).

18. A computer-implemented method (200) of operating a hydraulic system (1) for a vehicle (100), the hydraulic system (1) comprising a first and a second electric motor (10, 20), the method (200) comprising individually controlling the first and second electric motors (10, 20) to either run at a reference speed or to deliver a reference torque wherein, during operation, at least one of the first and second electric motors (10, 20) is controlled to deliver a reference torque.

19. A computer program product comprising program code for performing, when executed by a processor device, the computer-implemented method (200) of clause 18.

20. A non-transitory computer-readable storage medium comprising instructions, which when executed by the processor device, cause the processing circuitry to perform the computer-implemented method (200) of clause 18.

21. A motor control system (1) for a vehicle (100), the system (1) comprising
  a first electric motor (10),
  a second electric motor (20),
  a gearbox (30) arranged to be driven by the first and second electric motors (10, 20),
  a vehicle wheel arranged to be driven by the gearbox (30), and
  a control arrangement (50) configured to
    individually control the first and second electric motors (10, 20) to either run at a reference speed (10rs, 20rs) or to deliver a reference torque (10rt, 20rt) and
    during operation control at least one of the first and second electric motors (10, 20) to deliver a reference torque (10rt, 20rt).

The terminology used herein is for the purpose of describing particular aspects only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, actions, steps, operations, elements, and/or components, but do not preclude the presence or addition of one or more other features, integers, actions, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the disclosure being set forth in the following claims.

The invention claimed is:

1. A hydraulic system for a vehicle, the hydraulic system comprising
  a first electric motor,
  a second electric motor,
  a gearbox arranged to be driven by the first and second electric motors,
  a hydraulic pump arranged to be driven by the gearbox, and
  a control arrangement configured to:
  individually control the first and second electric motors to either run at a reference speed or to deliver a reference torque
  during operation control at least one of the first and second electric motors to deliver a reference torque, and
  control the first and second motors in response to a hydraulic supply request and is configured, based on said hydraulic supply request, to selectively
  control the first motor to run at a reference speed and the second motor to deliver a reference torque, or
  control the first motor to deliver a reference torque and the second motor to deliver a reference torque.

2. The hydraulic system of claim 1, wherein the control arrangement is configured to simultaneously control the first motor to run at a reference speed and control the second motor to deliver a reference torque.

3. The hydraulic system of claim 1, wherein the control arrangement is configured to
  control the first motor to run at a reference speed and the second motor to deliver a reference torque in case the hydraulic supply request involves adjusting the hydraulic pump speed, and control the first motor to deliver a reference torque and the second motor to deliver a reference torque in case the hydraulic supply request involves adjusting the hydraulic pump torque.

4. The hydraulic system of claim 3, wherein the control arrangement is configured to control the first motor to deliver a reference torque and the second motor to deliver a reference torque in case the desired hydraulic pump speed has remained unchanged for a predetermined duration of time.

5. The hydraulic system of claim 3, wherein the control arrangement is connected to an operator input interface and configured to control the first motor to deliver a reference torque and the second motor to deliver a reference torque in case the operator input interface is maneuvered in a manner that is predicted to involve an increase in the desired hydraulic pump torque.

6. The hydraulic system of claim 1, wherein the control arrangement comprises a first electronic control unit connected to the first motor and a second electronic control unit connected to the second motor.

7. The hydraulic system of claim 6, wherein the first electronic control unit has a faster response time than the second electronic control unit.

8. The hydraulic system of claim 7, wherein the first electronic control unit is configured to control the first motor to deliver a reference speed and the second electronic control unit is configured to control the second motor to deliver a reference torque.

9. The hydraulic system according to claim 6, wherein
the first electronic control unit comprises a first direct current voltage input and a first alternating current voltage output connected to the first motor, and
the second electronic control unit comprises a second direct current voltage input and a second alternating current voltage output connected to the second motor.

10. The hydraulic system of claim 1, adapted to, when the first motor is controlled to deliver a reference torque and the second motor is controlled to deliver a reference torque, control the first and second motors to deliver equal magnitudes of torques.

11. The hydraulic system of claim 1, wherein housings of the first and second motors are attached to a housing of the gearbox and, optionally, a housing of the hydraulic pump is attached to the housing of the gearbox.

12. The hydraulic system of claim 1, wherein the first and second motors are arranged to drive the gearbox in parallel.

13. The hydraulic system of claim 1, wherein the gearbox is a reduction gearbox.

14. The hydraulic system of claim 1, wherein the first and second motors are dimensioned such that operation of both motors is required during nominal operation of the hydraulic system.

15. A vehicle comprising the hydraulic system of claim 1, the vehicle optionally being a construction machine or an on-road vehicle.

16. The vehicle of claim 15 comprising
a vehicle electric control unit connected to a first electronic control unit adapted to control the first motor and connected to a second electronic control unit adapted to control the second motor,
a battery connected to the first and second electronic control units, and
an operator input interface.

17. A computer-implemented method of operating the hydraulic system according to claim 1, the method comprising individually controlling the first and second electric motors to either run at a reference speed or to deliver a reference torque wherein, during operation, at least one of the first and second electric motors is controlled to deliver a reference torque.

18. A non-transitory computer-readable storage medium comprising instructions, which when executed by the processor device, cause the processing circuitry to perform the computer-implemented method of claim 17.

* * * * *